(12) United States Patent
Shaughnessy

(10) Patent No.: US 10,585,007 B2
(45) Date of Patent: Mar. 10, 2020

(54) AIR TEMPERATURE SENSOR

(71) Applicant: Unison Industries, LLC, Jacksonville, FL (US)

(72) Inventor: Kyle Shaughnessy, Vernon, CT (US)

(73) Assignee: Unison Industries, LLC, Jacksonville, FL (US)

( * ) Notice: Subject to any disclaimer, the term of this patent is extended or adjusted under 35 U.S.C. 154(b) by 209 days.

(21) Appl. No.: 15/630,310

(22) Filed: Jun. 22, 2017

(65) Prior Publication Data

US 2018/0372557 A1 Dec. 27, 2018

(51) Int. Cl.
*G01K 13/02* (2006.01)

(52) U.S. Cl.
CPC ..... *G01K 13/028* (2013.01); *G01K 2013/024* (2013.01)

(58) Field of Classification Search
CPC .................. G01K 13/028; G01K 2013/024
See application file for complete search history.

(56) References Cited

U.S. PATENT DOCUMENTS

| | | |
|---|---|---|
| 4,142,824 A | 3/1979 | Andersen |
| 4,765,751 A | 8/1988 | Pannone et al. |
| 5,476,364 A | 12/1995 | Kildea |
| 5,733,102 A | 3/1998 | Lee et al. |
| RE36,215 E | 6/1999 | Rosenthal |
| 6,267,328 B1 | 7/2001 | Vest |
| 6,443,395 B1 | 9/2002 | Porte et al. |
| 6,609,825 B2 | 8/2003 | Ice et al. |
| 6,941,805 B2 | 9/2005 | Seidel et al. |
| 6,971,851 B2 | 12/2005 | Liang |
| 7,118,342 B2 | 10/2006 | Lee et al. |
| 7,156,552 B2 | 2/2007 | Fleming |
| 7,174,782 B2 | 2/2007 | Ice |
| 7,313,963 B2 | 1/2008 | Kuznar |
| 7,328,623 B2 | 2/2008 | Slagle et al. |
| 7,357,572 B2 | 4/2008 | Benning et al. |
| 7,441,948 B2 | 10/2008 | Bernard et al. |
| 7,674,036 B2 | 3/2010 | Severson |
| 7,845,222 B1 | 12/2010 | Goedel et al. |
| 7,854,548 B2 | 12/2010 | Sandnas et al. |
| 8,100,582 B1 | 1/2012 | Powell |
| 8,157,440 B2 | 4/2012 | Kulczyk |
| 8,172,507 B2 | 5/2012 | Liang |
| 8,517,604 B2 | 8/2013 | Parsons |
| 9,085,988 B2 | 7/2015 | Kwon et al. |
| 9,488,534 B2 | 11/2016 | Wigen et al. |

(Continued)

FOREIGN PATENT DOCUMENTS

| | | |
|---|---|---|
| CA | 2449335 | 1/2008 |
| EP | 2607872 A2 | 6/2013 |

OTHER PUBLICATIONS

Extended European Search Report and Opinion issued in connection with corresponding EP Application No. 18178617.9 dated Nov. 2, 2018.

*Primary Examiner* — Lisa M Caputo
*Assistant Examiner* — Philip L Cotey
(74) *Attorney, Agent, or Firm* — McGarry Bair PC

(57) ABSTRACT

A total air temperature sensor includes a nose having an airfoil cross section with a leading edge and trailing edge, a sensor housing spaced from and downstream of the nose defining a stagnation chamber with at least one inlet, and a temperature sensor positioned within the sensor housing.

22 Claims, 4 Drawing Sheets

(56) References Cited

U.S. PATENT DOCUMENTS

| | | | |
|---|---|---|---|
| 9,494,050 B2 | 11/2016 | Schnoebelen et al. | |
| 9,631,985 B2 | 4/2017 | Herman | |
| 2004/0261518 A1* | 12/2004 | Seidel | B64D 43/02 |
| | | | 73/182 |
| 2007/0220984 A1* | 9/2007 | Slagle | G01K 13/02 |
| | | | 73/708 |
| 2010/0176243 A1 | 7/2010 | Nieman et al. | |
| 2012/0285261 A1* | 11/2012 | Goedel | G01K 13/028 |
| | | | 73/861.42 |
| 2013/0163636 A1* | 6/2013 | Parsons | G01K 13/028 |
| | | | 374/158 |
| 2013/0315283 A1* | 11/2013 | Parsons | G01K 1/16 |
| | | | 374/208 |
| 2014/0064330 A1* | 3/2014 | Agami | G01K 13/028 |
| | | | 374/138 |
| 2014/0178207 A1 | 6/2014 | He et al. | |
| 2015/0063414 A1* | 3/2015 | Wigen | G01K 13/028 |
| | | | 374/138 |
| 2015/0093244 A1* | 4/2015 | Wigen | G01K 13/028 |
| | | | 416/61 |
| 2016/0032757 A1 | 2/2016 | Liu et al. | |
| 2016/0153284 A1 | 6/2016 | Kwon et al. | |
| 2017/0058772 A1 | 3/2017 | Frank et al. | |
| 2018/0348069 A1* | 12/2018 | Tan | G01K 13/02 |

\* cited by examiner

AIR TEMPERATURE SENSOR

BACKGROUND OF THE INVENTION

Turbine engines, and particularly gas or combustion turbine engines, are rotary engines that extract energy from a flow of combusted gases passing through the engine onto a multitude of rotating turbine blades. Gas turbine engines have been used for land and nautical locomotion and power generation, but are most commonly used for aeronautical applications such as airplanes or helicopters. In airplanes, gas turbine engines are used for propulsion of the aircraft.

During operation of a turbine engine, the total air temperature (abbreviated TAT, and also known as stagnation temperature) can be measured by a specially designed temperature probe mounted on the surface of the aircraft or the interior walls of the turbine engine. The probe is designed to bring the air to rest relative to the aircraft; the air experiences an adiabatic increase in temperature as it is brought to rest and measured, and the total air temperature is therefore higher than the ambient air temperature. TAT is an essential input for calculating static air temperature and true airspeed.

Because TAT sensors are often mounted in front of the turbine engine, they can be exposed to adverse conditions including high Mach numbers and icing conditions, as well as water and debris, which may affect the reading provided by the sensor.

BRIEF DESCRIPTION OF THE INVENTION

In one aspect, a total air temperature sensor includes a nose having an airfoil cross section with a leading edge and a trailing edge, a sensor housing having a pass-through passage and the sensor housing is spaced from and downstream of the trailing edge to define a stagnation chamber between the trailing edge and the sensor housing, a temperature sensor located within the pass-through passage; and at least one inlet to the stagnation chamber where air can enter the stagnation chamber and then flow out the pass-through passage, wherein a chord length of the airfoil cross section is less than 0.5 times a total length of the total air temperature sensor.

In another aspect, a total air temperature sensor includes a nose having an airfoil cross section with a leading edge and a trailing edge, a sensor housing having a pass-through passage and the sensor housing is spaced from and downstream of the trailing edge to define a stagnation chamber between the trailing edge and the sensor housing, a temperature sensor located within the pass-through passage, and at least one inlet to the stagnation chamber where air can enter the stagnation chamber and then flow out the pass-through passage, wherein the sensor housing has an angle of attack greater than the nose angle of attack.

DESCRIPTION OF EMBODIMENTS OF THE INVENTION

Figure 1:
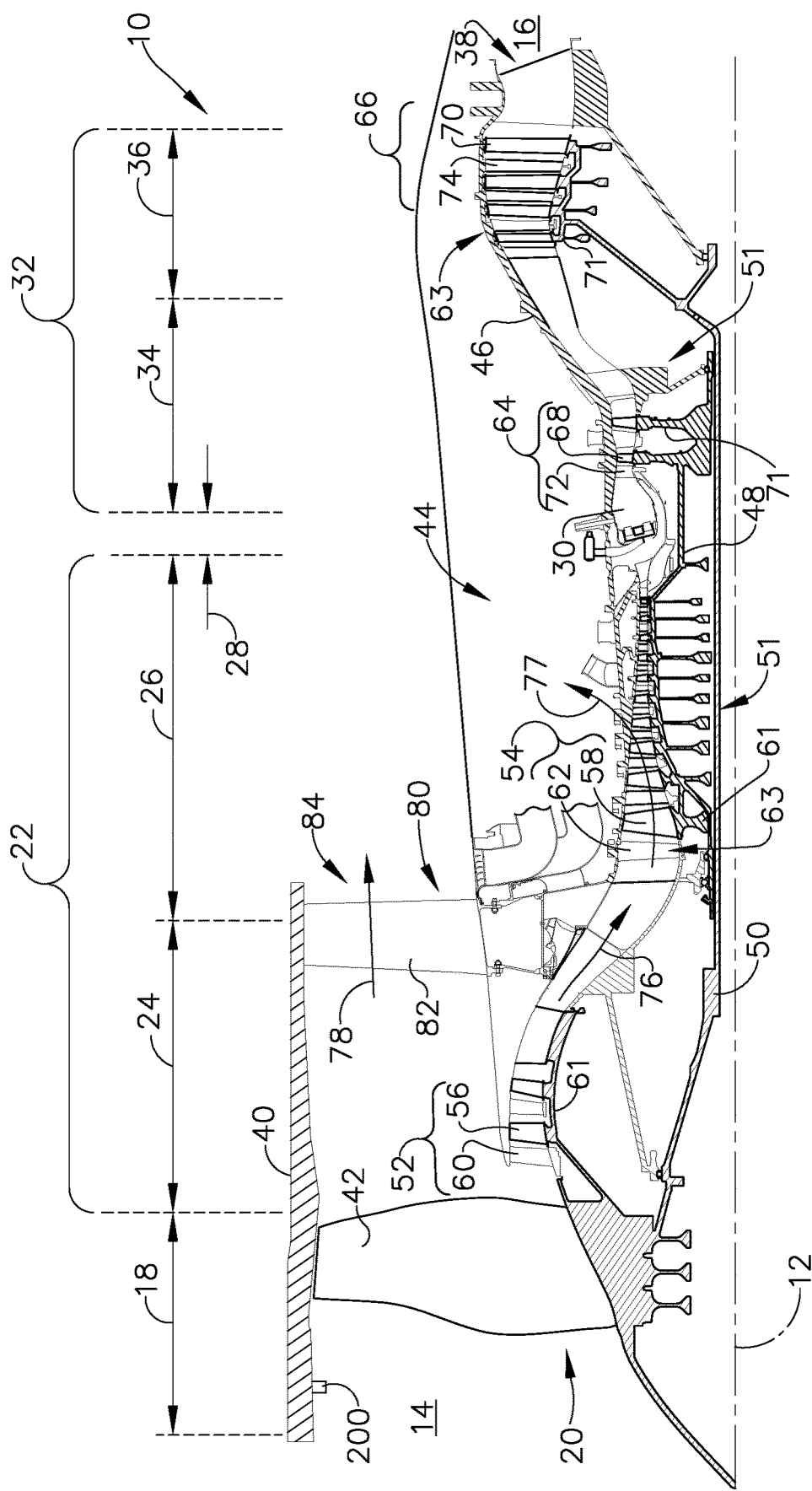
FIG. 1 is a schematic cross-sectional diagram of a gas turbine engine for an aircraft with a total air temperature sensor.

The described embodiments of the present disclosure are directed to a temperature sensor for an aircraft turbine engine. It will be understood, however, that the disclosure is not so limited and may have general applicability within an engine, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40. A total air temperature (TAT) sensor 200 can be disposed in the fan casing 40 as shown; however, this example is not meant to be limiting and the TAT sensor 200 may be positioned in other locations in the turbine engine 10.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
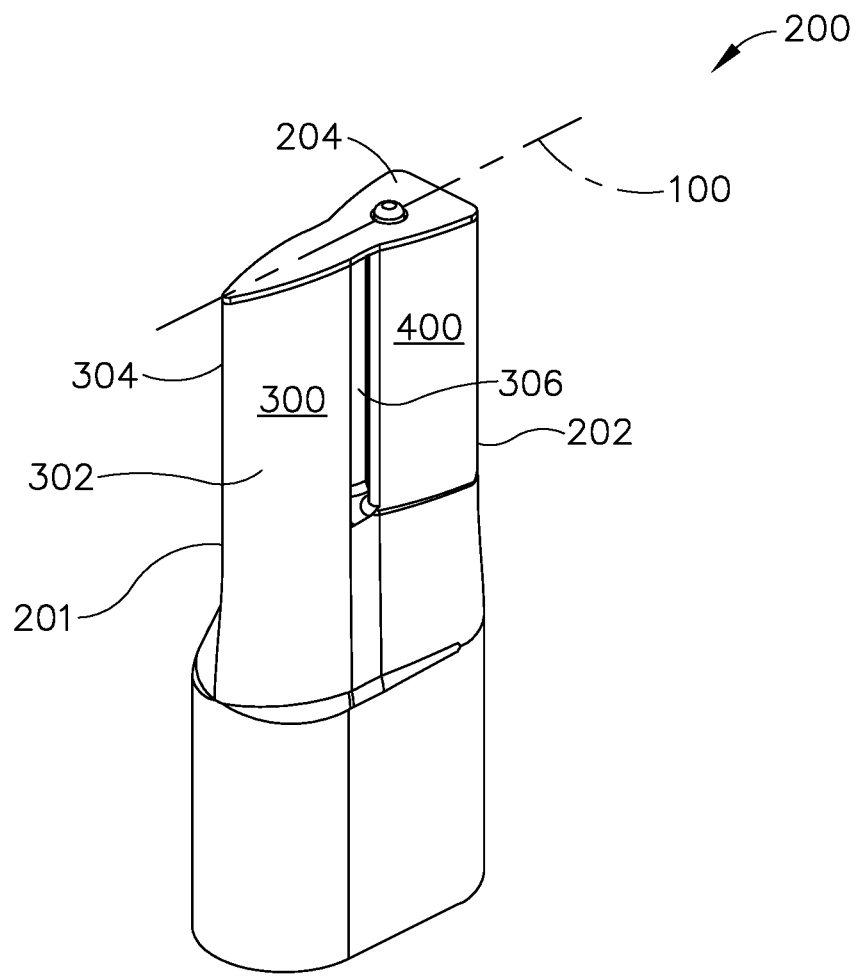
FIG. 2 is a perspective view of the total air temperature sensor of FIG. 1.

In FIG. 2, the TAT sensor 200 is illustrated comprising an axial centerline 100, a fore edge 201, an aft edge 202, a nose 300, and a sensor housing 400 spaced apart and downstream from the nose 300. The TAT sensor 200 may also include a cover plate 204 spanning the nose 300 and sensor housing 400 as shown. In addition, the nose 300 can have an airfoil cross section 302 (shown in further detail in FIG. 3) having a leading edge 304 and trailing edge 306 wherein the leading edge 304 can define the fore edge 201. The TAT sensor 200 may also be mounted to a suitable housing for attachment to the turbine engine 10.

Figure 3:
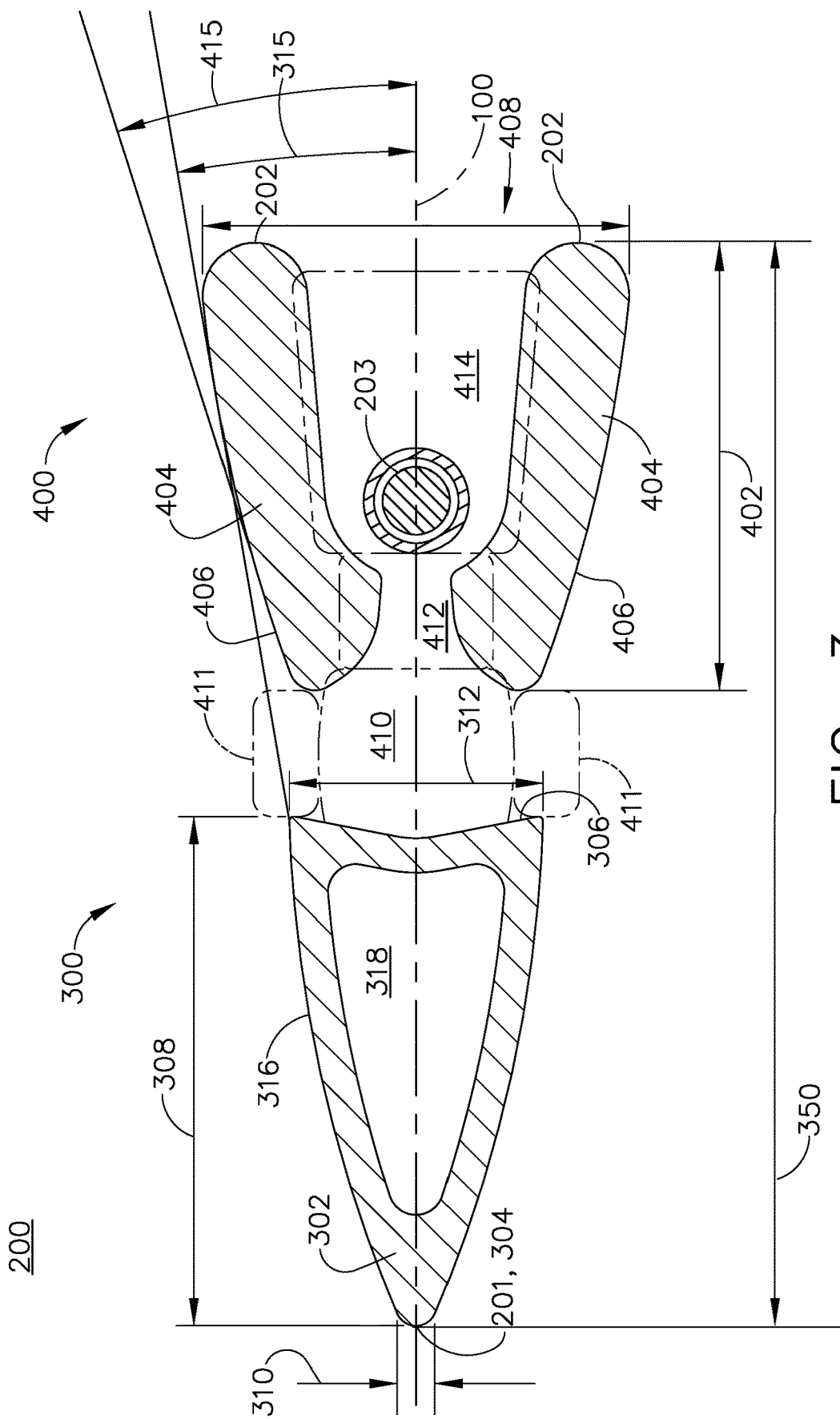
FIG. 3 is a cross-sectional view of the total air temperature sensor of FIG. 1.

FIG. 3 illustrates a cross-sectional view of the TAT sensor 200. The airfoil 302 can have a first height 310 at the leading edge 304 and a second height 312 at the trailing edge 306; it is contemplated that the first height 310 may be smaller than the second height 312, and the nose height may increase continuously between the first height 310 and second height 312. It is also contemplated that the sensor housing 400 can include a third height 414 near the aft edge; in non-limiting examples the third height 414 may be greater than the second height 312, or the third height 414 may be equal to the second height 312 or first height 310. Other combinations in the spirit of this disclosure are contemplated for use in the TAT sensor 200.

The nose 300 can further include a first outer surface 316, a hollow interior 318, and a chord length 308, and the trailing edge 306 of the airfoil 302 may be truncated as shown. The sensor housing 400 can further include an axial length 402, a second outer surface 406, sidewalls 404, and a temperature sensor 203 positioned between the sidewalls 404.

The TAT sensor 200 can have a total length 350 between the fore edge 201 and aft edge 202. It is contemplated in a space-reducing configuration that the chord length 308 of the nose 300 can be approximately the same size as the axial length 402 of the sensor housing 400; in a non-limiting example the chord length 308 can be less than 0.5 times the total length 350 of the TAT sensor 200.

A stagnation chamber 410 having at least one inlet 411 can be defined in the region between the nose 300 and sensor housing 400. In addition, a pass-through passage 408 having a converging inlet 412 and diverging outlet 413 can be defined between the sidewalls 404 of the sensor housing 400, where the converging inlet 412 can intersect the diverging outlet 413. The stagnation chamber 410 can be fluidly coupled to the converging inlet 412, and the temperature sensor 203 can be positioned within the diverging outlet 413 as shown.

In a region proximate the stagnation chamber 410, the first outer surface 316 of the nose 300 can form a first angle of attack 315 with respect to the centerline 100, and the second outer surface 406 of the sensor housing 400 can form a second angle of attack 415 with respect to the centerline 100. It is contemplated that the second angle 415 may be greater than the first angle 315 as shown; in one non-limiting example, the first angle could be greater than or equal to 2.0 degrees while the second angle could be greater than or equal to 10.0 degrees.

Figure 4:
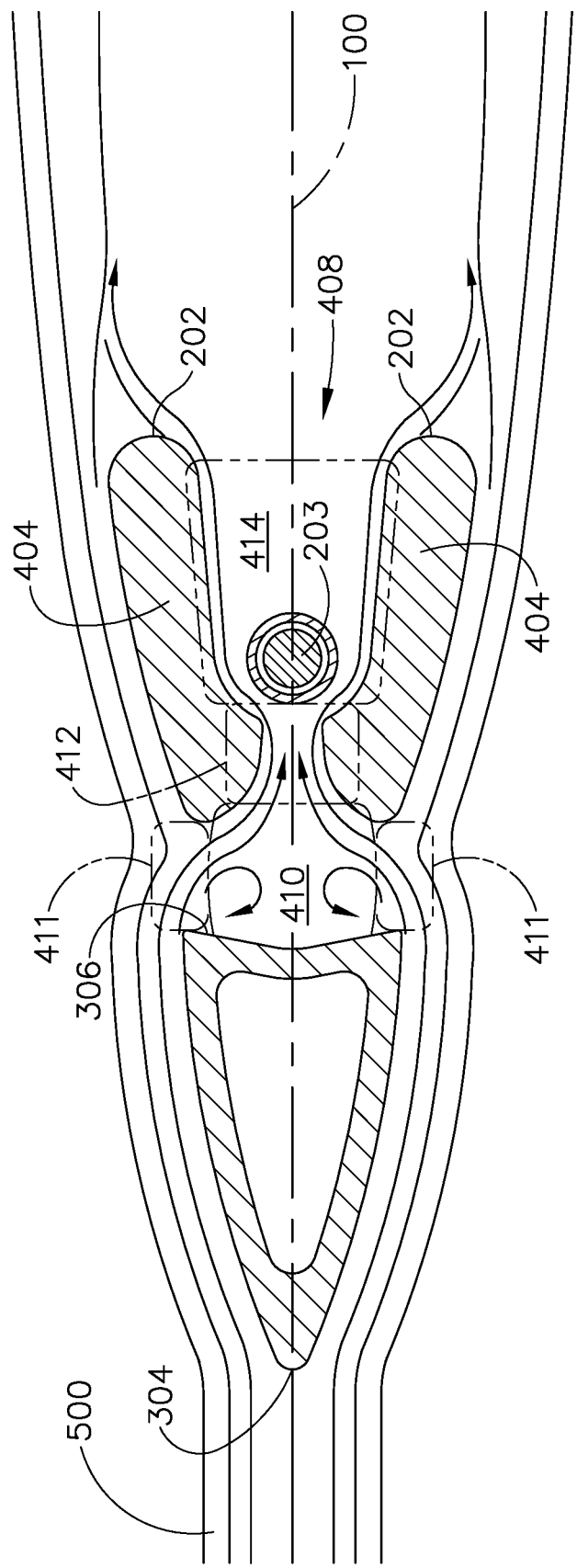
FIG. 4 is a cross-sectional view of the total air temperature sensor of FIG. 3 with air flows illustrated.

FIG. 4 illustrates the TAT sensor 200 of FIG. 3 along with a set of airflows 500; while the airflows 500 are illustrated moving in the same direction as the centerline 100, there may also be an angle of attack between the airflows 500 and the centerline 100. In operation, air can move toward the leading edge 304, and at least a portion of air can flow through the inlet 411 into the stagnation chamber 410 where it can be reduced in speed or brought to rest relative to the TAT sensor 200. A portion of air can also flow through the pass-through passage 408 by entering the converging inlet 412 and exiting the diverging outlet 413, and the temperature sensor 203 can measure the total air temperature of the air in its vicinity.

It can be appreciated that the size of the stagnation chamber 410 can be chosen such that water, ice, and debris moving toward the TAT sensor 200 may flow past the stagnation chamber 410 while air can flow into the stagnation chamber 410 and be measured by the temperature sensor 203, having the benefit of protecting the sensor 203 within the sidewalls 404. In one non-limiting example, the temperature sensor 203 was not impinged by water or ice in airflows moving at speeds of Mach 0.4 at an angle of attack of 5 degrees.

It should be further appreciated that other TAT sensors known in the prior art can have longer axial lengths or chord lengths; the reduced length of the TAT sensor 200 can bring a number of benefits, including reducing the thermal mass of the sensor 200 as well as reducing a boundary layer heating error that can occur as air flows along the nose outer wall 316 before encountering the temperature sensor 203. The smaller size of the TAT sensor 200 can also decrease the thermal response time of the temperature sensor 203 as well as reducing the thermal envelope surrounding the TAT sensor 200 in operation.

It should be understood that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A total air temperature sensor defining a centerline, the total air temperature sensor comprising:
    a nose having an airfoil cross section with a leading edge and a trailing edge;
    a sensor housing having a sensor housing trailing edge and a pass-through passage, whereby the sensor housing is spaced from and downstream of the trailing edge of the nose to define a stagnation chamber between the trailing edge of the nose and the sensor housing, wherein the centerline is defined axially from the leading edge of the nose to the sensor housing trailing edge of the sensor housing;
    a temperature sensor located within the pass-through passage; and
    at least one inlet to the stagnation chamber where air can enter the stagnation chamber and then flow out the pass-through passage, with the inlet at least partially defined by the trailing edge of the nose;
    wherein a length of the airfoil cross section of the nose between the leading edge and the trailing edge taken along the centerline is less than 0.5 times a total length of the total air temperature sensor taken along the centerline.

2. The total air temperature sensor of claim 1 wherein the nose has a truncated trailing edge.

3. The total air temperature sensor of claim 1 wherein a height of the airfoil is greater at the trailing edge than the leading edge.

4. The total air temperature sensor of claim 3 wherein the height of the airfoil increases from the leading edge to the trailing edge.

5. The total air temperature sensor of claim 4 wherein the height of the airfoil continuously increases from the leading edge to the trailing edge.

6. The total air temperature sensor of claim 1 wherein the sensor housing has sidewalls that are oriented at an angle relative to an axial center line.

7. The total air temperature sensor of claim 6 wherein the angle is greater than 2.0 degrees.

8. The total air temperature sensor of claim 1 wherein the pass-through passage comprises a converging inlet fluidly coupled to the stagnation chamber.

9. The total air temperature sensor of claim 8 wherein the pass-through passage comprises a diverging outlet provided at the trailing edge fluidly coupled to the converging inlet.

10. The total air temperature sensor of claim 9 wherein the converging inlet intersects the diverging outlet.

11. The total air temperature sensor of claim 10 wherein the temperature sensor is located within the diverging outlet.

12. The total air temperature sensor of claim 1 wherein the nose has a hollow interior.

13. A total air temperature sensor defining an axial centerline, the total air temperature sensor comprising:
    a nose having an airfoil cross section with a leading edge and a trailing edge;
    a sensor housing having a pass-through passage and the sensor housing is spaced from and downstream of the trailing edge to define a stagnation chamber between the trailing edge and the sensor housing;
    a temperature sensor located within the pass-through passage; and
    at least one inlet to the stagnation chamber where air can enter the stagnation chamber and then flow out the pass-through passage;
    wherein the sensor housing has a first angle of attack defined by an outer surface of the sensor housing at the forward edge of the sensor housing, relative to the axial centerline, wherein the first angle of attack is greater than a nose angle of attack, wherein the nose angle of attack is defined by a surface of the nose at the fore edge of the nose relative to the axial centerline.

14. The total air temperature sensor of claim 13 wherein the nose has a first outer surface defining a first angle relative to the axial centerline for the total air temperature sensor and the sensor housing has a second outer surface defining a second angle relative to the axial centerline, with the second angle being greater than the first angle.

15. The total air temperature sensor of claim 14 wherein the first angle is greater than 2.0 degrees and the second angle is greater than 10.0 degrees.

16. The total air temperature sensor of claim 14 wherein a length of the airfoil cross section relative to the axial centerline is less than 0.5 times a total length of the total air temperature sensor relative to the axial centerline.

17. The total air temperature sensor of claim 13 wherein a height of the airfoil is greater at the trailing edge than the leading edge.

18. The total air temperature sensor of claim 17 wherein the height of the airfoil increases from the leading edge to the trailing edge.

19. The total air temperature sensor of claim 13 wherein the pass-through passage comprises a converging inlet fluidly coupled to the stagnation chamber.

20. The total air temperature sensor of claim 19 wherein the pass-through passage comprises a diverging outlet fluidly coupled to the converging inlet.

21. The total air temperature sensor of claim 20 wherein the converging inlet intersects the diverging outlet.

22. A total air temperature sensor defining a centerline, the total air temperature sensor comprising:
- a nose having an airfoil cross section with a leading edge and a trailing edge;
- a sensor housing having a pass-through passage with an inlet and an outlet, whereby the sensor housing is spaced from and downstream of the trailing edge of the nose to define a stagnation chamber between the trailing edge of the nose and the sensor housing;
- an inlet to the stagnation chamber where air can enter the stagnation chamber and then flow out the pass-through passage; and
- a temperature sensor located within the pass-through passage;
- wherein the inlet of the pass-through passage converges at the stagnation chamber, and the pass-through passage diverges to the outlet from the inlet, with the temperature sensor provided in the diverging portion of the pass-through passage to the outlet.

* * * * *